(12) United States Patent
Babich et al.

(10) Patent No.: US 10,346,850 B2
(45) Date of Patent: Jul. 9, 2019

(54) CASE MANAGEMENT INTEGRATION WITH EXTERNAL CONTENT REPOSITORIES

(71) Applicant: International Business Machines Corporation, Armonk, NY (US)

(72) Inventors: Alan F. Babich, Mission Viejo, CA (US); Xin Feng, Beijing (CN); Mike A. Marin, Laguna Hills, CA (US); Cynthia M. Roberts, San Jose, CA (US); Mimi P. Vo, San Jose, CA (US); Alan T. Yaung, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/060,091

(22) Filed: Oct. 22, 2013

(65) Prior Publication Data

US 2014/0114865 A1    Apr. 24, 2014

Related U.S. Application Data

(63) Continuation of application No. 13/657,201, filed on Oct. 22, 2012, now abandoned.

(51) Int. Cl.
*G06Q 30/00* (2012.01)
*G06Q 10/00* (2012.01)
(Continued)

(52) U.S. Cl.
CPC ......... *G06Q 30/016* (2013.01); *G06F 16/184* (2019.01); *G06F 16/188* (2019.01);
(Continued)

(58) Field of Classification Search
None
See application file for complete search history.

(56) References Cited

U.S. PATENT DOCUMENTS 4,973,086 A  *  11/1990  Donnelly ............... B42F 21/00
                                                     281/38
5,151,989 A      9/1992  Johnson et al.
(Continued)

OTHER PUBLICATIONS

Callaghan et al., NFS Version 3 Protocol Specification, Sun Microsystems, Inc., Jun. 1995 (accessed at http://ietf.org/rfc/rfc1813.txt on Dec. 12, 2013).*

(Continued)

*Primary Examiner* — Patrick McAtee
(74) *Attorney, Agent, or Firm* — Lee Law, PLLC; Christopher B. Lee

(57) ABSTRACT

A case creation event originating from an external content repository is detected by a processor executing an inbound event handler of a distributed integration framework that integrates a case management system with the external content repository. The case creation event is configured by the distributed integration framework to cause creation of a case within the case management system. The inbound event handler instructs the case management system to create the case within the case management system. An outbound event handler of the distributed integration framework instructs the external content repository to create a proxy case to remotely represent the case created within the case management system.

24 Claims, 11 Drawing Sheets

(51) Int. Cl.
*G06F 16/182* (2019.01)
*G06F 16/188* (2019.01)
*G06F 16/23* (2019.01)

(52) U.S. Cl.
CPC ........ *G06F 16/1844* (2019.01); *G06Q 10/00* (2013.01); *G06F 16/2358* (2019.01); *G06F 16/2365* (2019.01)

(56) References Cited

U.S. PATENT DOCUMENTS

| | | | |
|---|---|---|---|
| 5,191,522 A | 3/1993 | Bosco et al. | |
| 5,513,314 A * | 4/1996 | Kandasamy et al. | 714/6.31 |
| 5,623,666 A | 4/1997 | Pike et al. | |
| 5,630,101 A * | 5/1997 | Sieffert | H04N 1/32502 709/246 |
| 5,638,504 A * | 6/1997 | Scott | G06F 9/451 715/202 |
| 5,689,706 A | 11/1997 | Rao et al. | |
| 5,701,462 A | 12/1997 | Whitney et al. | |
| 5,740,368 A * | 4/1998 | Villalpando | H04L 41/0213 709/202 |
| 5,781,633 A | 7/1998 | Tribble et al. | |
| 5,787,441 A | 7/1998 | Beckhardt | |
| 5,946,685 A * | 8/1999 | Cramer et al. | |
| 5,987,506 A | 11/1999 | Carter et al. | |
| 6,122,633 A | 9/2000 | Leymann et al. | |
| 6,138,124 A | 10/2000 | Beckhardt | |
| 6,151,639 A * | 11/2000 | Tucker et al. | 719/316 |
| 6,279,046 B1 | 8/2001 | Armstrong et al. | |
| 6,418,447 B1 | 7/2002 | Frey et al. | |
| 6,502,102 B1 * | 12/2002 | Haswell | G06F 11/3664 |
| 6,571,245 B2 | 5/2003 | Huang et al. | |
| 6,615,253 B1 * | 9/2003 | Bowman-Amuah | G06F 16/9574 709/219 |
| 6,728,877 B2 * | 4/2004 | Mackin | G06F 8/00 713/1 |
| 6,728,963 B1 | 4/2004 | Forin et al. | |
| 6,772,159 B1 | 8/2004 | Blount et al. | |
| 6,826,579 B1 * | 11/2004 | Leymann | G06Q 10/06 717/103 |
| 6,947,940 B2 | 9/2005 | Anderson et al. | |
| 6,978,423 B2 * | 12/2005 | Seetharaman | G06F 9/542 715/764 |
| 6,990,478 B2 | 1/2006 | Loy et al. | |
| 7,055,147 B2 | 5/2006 | Iterum et al. | |
| 7,079,044 B1 * | 7/2006 | Stanfield | G06F 17/30011 340/539.13 |
| 7,236,975 B2 * | 6/2007 | McCauley et al. | |
| 7,281,019 B2 * | 10/2007 | Taketa | G06Q 10/10 707/792 |
| 7,295,120 B2 * | 11/2007 | Waldner | G06K 7/00 235/385 |
| 7,418,439 B2 | 8/2008 | Wong | |
| 7,426,548 B2 * | 9/2008 | Griffin et al. | 709/219 |
| 7,433,896 B2 * | 10/2008 | Owen et al. | |
| 7,496,687 B2 * | 2/2009 | Griffin et al. | 709/249 |
| 7,516,167 B2 * | 4/2009 | Selman et al. | |
| 7,552,223 B1 | 6/2009 | Ackaouy et al. | |
| 7,574,488 B2 | 8/2009 | Matsubara | |
| 7,593,888 B2 | 9/2009 | Block et al. | |
| 7,617,240 B2 * | 11/2009 | Guyan et al. | 705/1.1 |
| 7,631,296 B2 | 12/2009 | Seshadri et al. | |
| 7,702,744 B2 * | 4/2010 | Hoshiai | G06F 17/3061 709/217 |
| 7,840,614 B2 * | 11/2010 | Owen et al. | 707/821 |
| 7,913,105 B1 | 3/2011 | Ganesh et al. | |
| 7,917,537 B2 * | 3/2011 | McVeigh et al. | 707/802 |
| 7,953,734 B2 * | 5/2011 | McVeigh et al. | 707/736 |
| 7,971,144 B2 * | 6/2011 | Paul et al. | 715/744 |
| 8,099,779 B2 * | 1/2012 | Owen et al. | 726/17 |
| 8,200,700 B2 * | 6/2012 | Moore et al. | 707/791 |
| 8,296,338 B2 | 10/2012 | Caso et al. | |
| 8,661,154 B2 * | 2/2014 | Farver | G06F 8/71 709/234 |
| 2002/0098840 A1 | 7/2002 | Hanson et al. | |
| 2002/0152210 A1 | 10/2002 | Johnson et al. | |
| 2002/0178271 A1 * | 11/2002 | Graham | G06F 21/6245 709/229 |
| 2003/0023473 A1 | 1/2003 | Guyan et al. | |
| 2003/0167358 A1 | 9/2003 | Marvin et al. | |
| 2004/0167981 A1 | 8/2004 | Douglas et al. | |
| 2004/0254945 A1 * | 12/2004 | Schmidt | G06F 8/34 709/203 |
| 2004/0255048 A1 * | 12/2004 | Lev Ran | G06F 9/546 709/249 |
| 2005/0060281 A1 | 3/2005 | Bucher et al. | |
| 2005/0060337 A1 | 3/2005 | Chou et al. | |
| 2005/0086384 A1 | 4/2005 | Ernst | |
| 2006/0085412 A1 * | 4/2006 | Johnson et al. | 707/4 |
| 2006/0122955 A1 | 6/2006 | Bethlehem et al. | |
| 2007/0174428 A1 * | 7/2007 | Lev Ran et al. | 709/218 |
| 2008/0033969 A1 | 2/2008 | Koo et al. | |
| 2008/0040397 A1 | 2/2008 | Herbeck et al. | |
| 2008/0046471 A1 | 2/2008 | Moore et al. | |
| 2008/0148234 A1 | 6/2008 | Clemm et al. | |
| 2009/0089078 A1 | 4/2009 | Bursey | |
| 2009/0157508 A1 | 6/2009 | Illingworth et al. | |
| 2009/0158292 A1 | 6/2009 | Rattner et al. | |
| 2009/0171897 A1 * | 7/2009 | Spinola | G06Q 10/06 |
| 2010/0121816 A1 | 5/2010 | Petri | |
| 2011/0041140 A1 * | 2/2011 | Harm | G06F 9/4843 719/318 |
| 2011/0320494 A1 | 12/2011 | Fisher et al. | |
| 2011/0320504 A1 * | 12/2011 | Marin | 707/805 |
| 2012/0023129 A1 | 1/2012 | Vedula et al. | |
| 2012/0084267 A1 | 4/2012 | Tulkoff et al. | |
| 2014/0114918 A1 | 4/2014 | Babich et al. | |
| 2014/0214915 A1 * | 7/2014 | Dragon | H04L 43/04 709/201 |

OTHER PUBLICATIONS

Framework. (1999). In Dictionary of Multimedia and Internet Applications: A Guide for Developers and Users. Retrieved from http://www.credoreference.com/entry/wdmia/framework.*
IBM Federated Content Management, ibm.com/redbooks, available at http://www.redbooks.ibm.com/redbooks/pdfs/sg247742.pdf, Apr. 2010 (accessed Jan. 9, 2019).*
IBM Red Book, "FileNet P8 Platform and Architecture," available at (http://www.redbooks.ibm.com/abstracts/SG247667.html (accessed Feb. 16, 2019).*
IBM Knoweldge Center, "Types of remote procedure call," available at https://www.ibm.com/support/knowledgecenter/SSGMCP_5.3.0/com.ibm.cics.ts.doc/dfhtm/topics/dfhtmc00195.html (accessed Feb. 7, 2019).*
IBM Redbook, "Getting Started on Integrating Your Information," 2003, available at http://www.redbooks.ibm.com/redbooks/pdfs/sg246892.pdf (accessed Feb. 7, 2019).*
Versace, Michael, "What Is Federated Records Management," available at https://wikibon.org/wiki/v/What_is_Federated_Records_Management, Apr. 12, 2010 (accessed Jan. 9, 2019).*
Oracle, "Asynchronous and Synchronous Remote Procedure Call Communication," 2010, available at https://docs.oracle.com/cd/E19048-01/chorus5/806-6897/architecture-109/index.html (accessed Feb. 7, 2019).*
United States Patent and Trademark Office, Office Action for U.S. Appl. No. 13/657,201, dated Sep. 16, 2013, pp. 1-19, Alexandria, VA, USA.
United States Patent and Trademark Office, Office Action for U.S. Appl. No. 13/657,201, dated Jan. 2, 2014, pp. 1-49, Alexandria, VA, USA.
F. Robert Jacobs, et al., Enterprise resource planning (ERP)—A brief history, Journal of Operations Management, Dec. 12, 2006, pp. 357-363, vol. 25, Elsevier B.V., published online at: http://www.sciencedirect.com/science/article/pii/S0272696306001355.

(56) References Cited

OTHER PUBLICATIONS

Author Unknown, Manufacturing—Moving Towards a Collaborative Supply Chain, Sep. 9, 2010, pp. 1-67, Publisher unknown, published online at: http://theprofessornotes.com/wp-content/uploads/2010/09/Manufacturing-moving-towards-a-collaborative-supply-chain_wiki.pdf.

United States Patent and Trademark Office, Office Action for U.S. Appl. No. 13/655,004, dated Jan. 17, 2014, pp. 1-38, Alexandria, VA, USA.

United States Patent and Trademark Office, Office Action for U.S. Appl. No. 13/655,004, dated Aug. 7, 2014, pp. 1-42, Alexandria, VA, USA.

United States Patent and Trademark Office, Office Action for U.S. Appl. No. 13/655,004, dated Jan. 13, 2015, pp. 1-56, Alexandria, VA, USA.

United States Patent and Trademark Office, Office Action for U.S. Appl. No. 13/655,004, dated May 1, 2015, pp. 1-46, Alexandria, VA, USA.

Peter Mell, et al., Effectively and Securely Using the Cloud Computing Paradigm, Presentation, Oct. 7, 2009, pp. 1-80, National Institute of Standards and Technology (NIST), Giathersburg, MD, USA.

Peter Mell, et al., The NIST Definition of Cloud Computing (Draft), Special Publication 800-145 (Draft), Jan. 2011, pp. 1-7, National Institute of Standards and Technology (NIST), Giathersburg, MD, USA.

United States Patent and Trademark Office, Office Action for U.S. Appl. No. 13/655,004, Informally citing several illegible references, dated Aug. 7, 2014, p. 35, Alexandria, VA, USA.

Author Unknown, IBM Software Globalization: IBM Terminology, Website/page, Oct. 19, 2012, pp. 1, IBM Corporation, Printed from: http://web.archive.org/web/20121019115624/http://www-01.ibm.com/software/globalization/terminology/.

Author Unknown, Wikipedia: Symbolic Link, Webpage/site, Sep. 26, 2012, pp. 1-7, Wikimedia Foundation, Inc., Printed from: http://web.archive.org/web/20120926004124/http://en.wikipedia.org/wiki/Symbolic_link.

United States Patent and Trademark Office, Office Action for U.S. Appl. No. 13/655,004, dated Aug. 25, 2015, pp. 1-62, Alexandria, VA, USA.

Anton W. Fetting, et al., Administrative Patent Judges, United States Patent and Trademark Office, Patent Trial and Appeal Board, Decision on Appeal for Appeal No. 2017-000669, U.S. Appl. No. 13/655,004, Jun. 22, 2018, pp. 1-19, Alexandria, VA, USA.

United States Patent and Trademark Office, Examiners Answer for U.S. Appl. No. 13/655,004, dated Aug. 12, 2016, pp. 1-69, Alexandria, VA, USA.

United States Patent and Trademark Office, Office Action for U.S. Appl. No. 13/655,004, dated Sep. 20, 2018, pp. 1-40, Alexandria, VA, USA.

* cited by examiner

CASE MANAGEMENT INTEGRATION WITH EXTERNAL CONTENT REPOSITORIES

RELATED APPLICATIONS

This application is a continuation of, claims priority to, and claims the benefit of U.S. patent application Ser. No. 13/657,201, titled "CASE MANAGEMENT INTEGRATION WITH EXTERNAL CONTENT REPOSITORIES," which was filed in the U.S. Patent and Trademark Office on Oct. 22, 2012, and which is incorporated herein by reference in its entirety.

BACKGROUND

The present invention relates to case management. More particularly, the present invention relates to case management integration with external content repositories.

Case management is a technology that involves management of customer/client case issues. Case management may include management of customer/client cases for insurance companies, credit card companies, and other types of businesses. A case related work item may be an auto accident claim, a credit card application, a customer complaint issue, or other item tracked in association with a case that has been created for a customer or client.

BRIEF SUMMARY

A method includes detecting, via a processor executing an inbound event handler of a distributed integration framework that integrates a case management system with an external content repository, a case creation event originating from the external content repository that is configured via the distributed integration framework to cause creation of a case within the case management system; instructing, via the inbound event handler, the case management system to create the case within the case management system; and instructing, via an outbound event handler of the distributed integration framework, the external content repository to create a proxy case to remotely represent the case created within the case management system.

A system includes a distributed integration framework that integrates a case management system with an external content repository; and a processor programmed to: detect, at an inbound event handler of the distributed integration framework, a case creation event originating from the external content repository that is configured via the distributed integration framework to cause creation of a case within the case management system; instruct, via the inbound event handler, the case management system to create the case within the case management system; and instruct, via an outbound event handler, the external content repository to create a proxy case to remotely represent the case created within the case management system.

A computer program product includes a computer readable storage medium having computer readable program code embodied therewith, where the computer readable program code when executed on a computer causes the computer to detect, via an inbound event handler of a distributed integration framework that integrates a case management system with an external content repository, a case creation event originating from the external content repository that is configured via the distributed integration framework to cause creation of a case within the case management system; instruct, via the inbound event handler, the case management system to create the case within the case management system; and instruct, via an outbound event handler of the distributed integration framework, the external content repository to create a proxy case to remotely represent the case created within the case management system.

DETAILED DESCRIPTION

Figure 1:
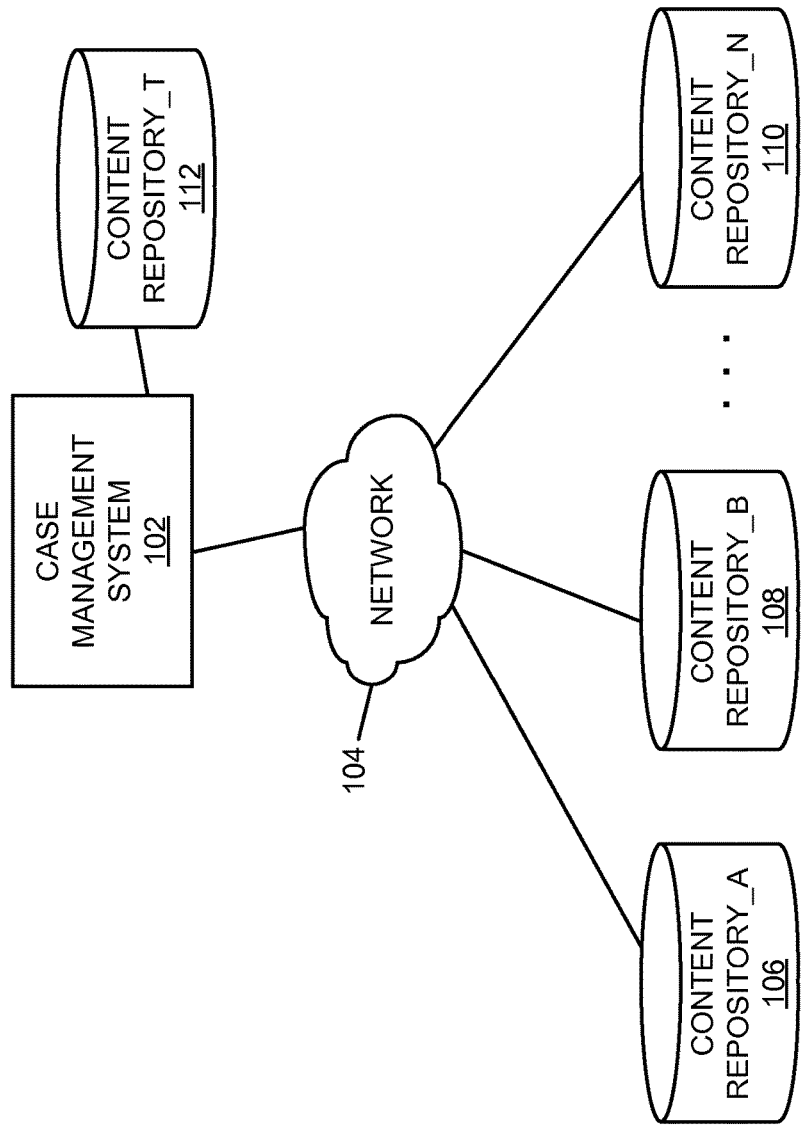
FIG. 1 is a block diagram of an example of an implementation of a system for case management integration with external content repositories according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides case management integration with external content repositories. The present technology provides a distributed integration framework that interfaces a case management system (alternatively "case manager" herein) with one or more external content repositories that may be implemented using different/heterogeneous platform technologies. The distributed integration framework provides a logical interface that implements bi-directional case event handlers (inbound to the case manager and outbound to the respective content repository) for each pair of integrated devices. The bi-directional case event handlers provide bi-directional integration of cases within a case manager and documents (e.g., content objects) stored in the external content repositories. The bi-directional case event handlers trigger events, for example as described in more detail below, to cause creation of proxy cases at the respective content repositories that represent actual cases managed by the case manager. Similarly, events may be triggered to cause the case manager to create proxy content objects that represent the actual content objects stored at the different content repositories. The respective content objects (actual or proxy) may be added to the respective cases (conversely proxy or actual) by each device such that each device has a representation of case and content object associations. As such, case management system and external content repository integration may be improved to propagate updates performed on the respective proxy objects to the device that manages the respective actual objects independently of security and versioning model differences implemented via the different platforms that support the respective devices.

The events triggered by the bi-directional case event handlers may be implemented using programming interfaces, such as application programming interfaces (APIs), associated with the respective case management system and the external content repositories. Alternatively, the events may be triggered via any other technology appropriate for a given implementation.

The event handler monitors and manages a queue of case events created by an event monitor. Each case event describes an action to be taken on the case manager. The event handler interprets the event and performs the specified action on the respective device. As described above, a programming interface may be utilized to implement the respective action, such as to perform application-level functionality associated with the respective event.

Within the context of case management, several usage scenarios may be supported. For example, a case may be launched within the case manager in response to document creation within an external repository, a document may be added to a case instance, a document may be removed from a case instance, a document may be deleted, a case may be split, an item type of a document may be changed (e.g., re-indexed), and cases may be manually created. Other possible usage scenarios are possible and all are considered within the scope of the present subject matter. The usage scenarios described above will be described in more detail further below.

As described above, proxy objects that represent actual objects stored at the respective integrated devices may be created to facilitate integration of the case manager with the external content repositories to implement the usage scenarios. The proxy objects stored at the respective devices may be integrated with objects hosted by the respective device to allow both integrated devices to have a comprehensive view of content object (e.g., document) and case linkages. Details of the event processing to implement usage scenarios will be described below with reference to the distributed integration framework and the bi-directional event handlers implemented by the distributed integration framework.

With respect to event monitoring, generation, and processing, an event monitor monitors and receives events that are triggered, such as for example in association with a case solution performed by a case manager or a document action performed by a content repository. Additionally, the event handlers generate events to perform the respective operations at the respective devices. These events may be placed into the database queue (or case manager queue) in a sequential order. The event handler monitors and manages the respective queue to which it is assigned. The event handler may read the events individually or in batches from the assigned queue, take the actions on the case manager or content repository, and update the queue to indicate that the events have been processed. Internally, the event handler converts the information from the respective events into programming interface events, (e.g., API calls) on the case manager/content repository, as appropriate for the given event and event handler.

The event handler may scan the respective event queue (e.g., database event queue or case manager event queue) to identify unprocessed events. The event queue scanning may be based upon a configured scan interval specified within an event properties file. A dedicated scanner thread may be assigned to event scanning.

When the events are processed, they may be marked as "processed" in the respective event queue. All the events marked as "processed" may be deleted from a table by the event handler. Deletion of events may be based upon a configured purge interval set in the properties file. A dedicated purger thread may be assigned to event deletion.

The event handler processes the information in an event and performs the case manager (or content repository) API calls to complete the action triggered by the event. If one of the events fails, the event handler may update a retry count for the failed message, wait for the specified scan interval, and start a new scan. If the retry count for the failed event is still less than a configured maximum retry count, then the failed event may be processed as the first event of the new scan. If the retry count exceeds the specified maximum, the failed event may be skipped. As each event succeeds, the event handler may update the status of the event in the event queue to indicate that the event has been processed and that it is available to be deleted.

An automatic recovery for event status update may also be incorporated. If the event handler is shut down, and there are any events in the memory whose status in the queue are not updated to reflect their retry or processed status in memory, then the current status of the events being tracked in the memory may be written to the properties file. When the respective event handler is restarted, the properties file may be read and an attempt to update the queue to reflect the desired status may be performed.

Returning to the description of possible usage scenarios, with respect to launching a case within the case manager in response to document creation within an external repository, two example events may be triggered. A "create item" event (e.g., ItemCreate) may be generated. The create item event may cause an action of creation of a proxy document in the case manager. A case folder may be created automatically. A second "add proxy document to folder" event (e.g., FolderAdd) may be triggered. The add proxy document to folder event causes the addition of the proxy document to the newly-created folder, as described in more detail below. The add proxy document to folder event may be skipped if a child persistent identifier in the folder is the same as an originating persistent identifier in the event.

With respect to addition of a document to a case instance using the add proxy document to folder event, the event may cause a search for the proxy document to be performed. The proxy document may be created if the proxy document does not already exist. The proxy document may then be filed to the designated case folder.

With respect to removing a document from a case instance, a "remove document from case" event (e.g., FolderRemove) may be generated. The remove document from case event may cause the proxy document to be un-filed from the designated case folder. If the proxy document is not filed with other case folders, the proxy document may be deleted.

With respect to deletion of a document, a "delete item" event (e.g., ItemDelete) may be generated. The delete item event may cause the proxy document to be un-filed from the designated case folder (and any other case folders to which the proxy document is filed), followed by deletion of the proxy document.

With respect to splitting a case, this scenario is covered in other scenarios described above. For example, a new case folder may be manually created. A document may be removed from another case folder and added to the newly-created case folder. The events described above support this form of processing to split a case.

With respect to changing an item type of a document (e.g., re-indexing), two events may be generated. A "re-indexing" event (e.g., Reindex) may be generated that causes a verification that the designated item type participates in the case manager. If the proxy document does not exist in a case folder, the event handler treats this as launching a case with document creation, as described above. Otherwise, if a proxy document exists in a case folder, the event handler invokes a class change event (e.g., "Change class" API call) and updates the persistent identifier string to the new value. A second "re-index source" event (e.g., ReindexFrom) may be generated that causes verification that the item type participates in case management. The event handler invokes a class change event (e.g., "Change class" API call) and updates the persistent identifier string to the new value.

With respect to cases may be manually created, a user may manually create a case using a user interface of the case management system. In such a situation, the inbound and outbound event handlers are not involved. As such, user interactions with the case management system may continue uninterrupted concurrently with implementation of the present technology.

It should be noted that conception of the present subject matter resulted from recognition of certain limitations associated with case management. For example, it was observed that existing case management systems do not provide content management for cases within external repositories. It was further observed that content repositories may operate on different hardware platforms and that there is no existing integration technology that provides integration between the case management systems and these disparate technology platforms that support content repositories. It was specifically observed that an advanced case management function for Content Manager Version 8 (CM8) customers is provided through the use of Content Federation Services (CFS). It was observed that, as a result, CM8 document metadata is federated into a FileNet® P8 system in order for a case manager to recognize the documents. However, it was determined that CFS provides only one-way replication from CM8 to FileNet® P8. As such, it was determined that changed data from FileNet® P8 is lost and is not replicated back to CM8. It was further determined that security model differences exist between CM8 and FileNet® P8 regarding protection of federated metadata in a FileNet® P8 environment. Additionally, it was observed that versioning model differences exist between CM8 and FileNet® P8, and that these version model differences will likely exist in future independent revisions of such products. As such, it was determined that technology to manage heterogeneous external content repositories that involves the generation and management of case-related events via bi-directional case management event handlers would provide bi-directional integration between cases within a case management system and documents in one or more external content repositories. The present subject matter improves case management and external content repository functionality by providing for case management integration with external content repositories, as described above and in more detail below.

The case management integration with external content repositories described herein may be performed in real time to allow prompt event propagation and handling between a case management system and one or more external content repositories. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for case management integration with external content repositories. A case management system 102 communicates via a network 104 with an external content repository_A 106, an external content repository_B 108, through an external content repository_N 110. The case management system 102 also communicates with a content repository_T 112. It should be noted that the content repository_T 112 may be coupled to the case management system 102 or network connected via the network 104, as appropriate for a given implementation.

As will be described in more detail below in association with FIG. 2 through FIG. 7E, the case management system 102 and the external content repository_A 106 through the external content repository_N 110 may each provide automated case management integration with external content repositories. The automated case management integration with external content repositories is based upon case event handling by the respective devices. Case related events and document related events are propagated between the respective devices to provide event-based case management integration with external content repositories. A variety of possibilities exist for implementation of the present subject matter, and all such possibilities are considered within the scope of the present subject matter.

It should be noted that any of the respective computing devices described in association with FIG. 1 may be implemented using any technology appropriate for a given implementation. For example, the respective computing devices may include devices such as a computing devices (e.g., desktop, laptop, server, etc.), or any other device capable of processing information as described above and in more detail below. It should further be noted that while the respective external content repositories 106 through 110 are illustrated as single components for ease of illustration purposes, these external content repositories may include multiple devices and tiers of devices.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
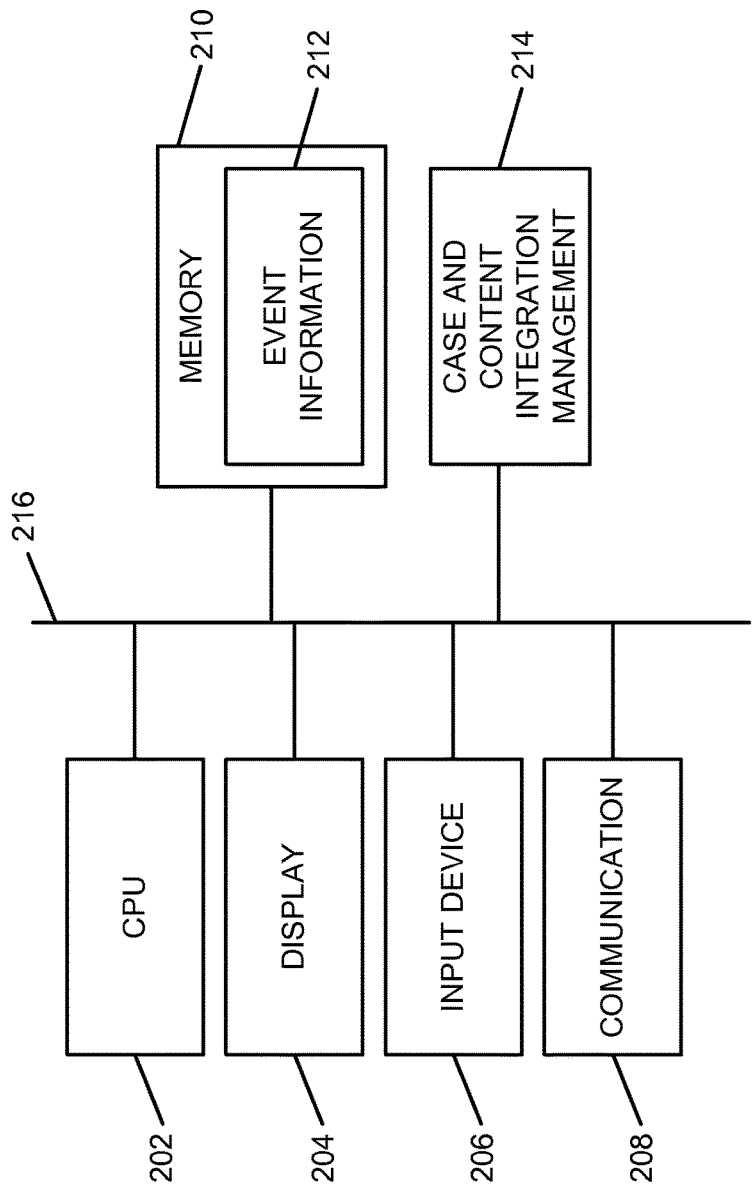
FIG. 2 is a block diagram of an example of an implementation of a core processing module capable of performing case management integration with external content repositories according to an embodiment of the present subject matter.

FIG. 2 is a block diagram of an example of an implementation of a core processing module 200 capable of performing case management integration with external content repositories. The core processing module 200 may be associated with each of the case management system 102 and the external content repository_A 106 through the external content repository_N 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of case management and content management events in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an event information storage area 212 that stores case management and/or content management events and related information within the core processing module 200. The event information storage area 212 may also be used to implement event queues to facilitate sequential processing of events, either individually or in batches, in association with the respective device to which the events are directed. As will be described in more detail below, the event information stored within the event information storage area 212 is used to integrate the case management system 102 with the external content repository_A 106 through the external content repository_N 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A case and content integration management module 214 is also illustrated. The case and content integration management module 214 provides case event and content event management for the core processing module 200, as described above and in more detail below. The case and content integration management module 214 implements the automated case management integration with external content repositories of the core processing module 200. The case and content integration management module 214 represents a distributed module that provides functionality in association with each of a set of integrated devices, such as the case management system 102 with one or more of the content repositories 106 through 110. Complementary event processing is performed via the respective distributed and integrated case and content integration management modules 214 of the respective devices using distributed event processing capabilities.

The case and content integration management module 214 includes an event monitor and event handlers to process the events. The event monitor receives events that are triggered, such as for example in association with a case solution performed by a case manager or a document action performed by a content repository. Additionally, the event handlers generate events, such as programming interface events (e.g., application programming interface (API) events), as appropriate for a given implementation to perform the respective operations at the respective devices. These events may be placed into the database queue (or case manager queue) in a sequential order. The event handler monitors and manages the respective queue to which it is assigned. The event handler may read the events individually or in batches from the assigned queue, take the actions on the case manager or content repository, and update the queue to indicate that the events have been processed. Internally, the event handler converts the information from the respective events into programming interface events (e.g., API calls) on a case manager/content repository, as appropriate for the given event and event handler.

It should be noted that the case and content integration management module 214 is illustrated as a single module for ease of illustration and description purposes. However, it should be noted that this illustration represents a distributed integration module that inter-operates between devices to implement platform and protocol conversion, security management, and other functionality to allow integration of devices that utilize different platform and protocol technology.

As described in more detail below, the case and content integration management module 214 implements a distributed logical integration framework that includes an integration module for each external content repository to be integrated with a case management system, such as the case management system 102. The integration module associated with each external content repository may include inbound and outbound event handlers that perform any platform/protocol conversion, security implementation and conversion, and other functionality to effectively integrate the respective external content repository with a case management system, such as the case management system 102. The respective inbound and outbound event handlers represent distributed components with portions of the processing implemented by the respective handlers implemented in each case and content integration management module 214 associated with a particular event interaction. As such, the case and content integration management module 214 provides distributed case and content bridging capabilities that include platform/protocol integration, security enforcement, and other integration capabilities. Due to the distributed nature of the functionality provided by the inbound event handler and the outbound event handler, these devices will alternatively be referred to herein as a "distributed inbound event handler" and a "distributed outbound event handler," respectively.

It should also be noted that the case and content integration management module 214 may form a portion of other circuitry described without departure from the scope of the present subject matter. Further, the case and content integration management module 214 may alternatively be implemented as an application stored within the memory 210. In such an implementation, the case and content integration management module 214 may include instructions executed by the CPU 202 for performing the functionality described herein. The CPU 202 may execute these instructions to provide the processing capabilities described above and in more detail below for the core processing module 200. The case and content integration management module 214 may form a portion of an interrupt service routine (ISR), a portion of an operating system, a portion of a browser application, or a portion of a separate application without departure from the scope of the present subject matter.

It should additionally be noted that coding implementations may be distributed at different modules. For example, the primary code portion of the distributed inbound event handler may be implemented within each external content repository, while the primary code portion of the distributed outbound event handler may be implemented within the case management system 102. However, it should further be noted that code to process received inbound events generated by the inbound event handler and to invoke API calls to the case management system 102 may be implemented within the case management system 102, while code to process received outbound events generated by the outbound event handler and to invoke API calls to the respective case repository may be implemented within the respective case repository. Further, events may be generated within the respective event handler locally based and propagated by the respective event handler to the respective API. For example, as described in more detail below, a user of the case management system 102 may desire to add an existing document stored in a case repository to an existing case. In such a situation, the user may provide the content repository name/identifier and the document name to the case management system 102 API, which will in turn cause an inbound event to be generated by the inbound event handler back to the case management system 102 API to initiate processing to add the document as described in more detail below. As such, many possibilities exist for code distribution, event initiation and distribution, and other processing associated with the case management integration with external content repositories described herein, and all such possibilities are considered to be within the scope of the present subject matter.

The CPU 202, the display 204, the input device 206, the communication module 208, the memory 210, and the case and content integration management module 214 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a customer service computing device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
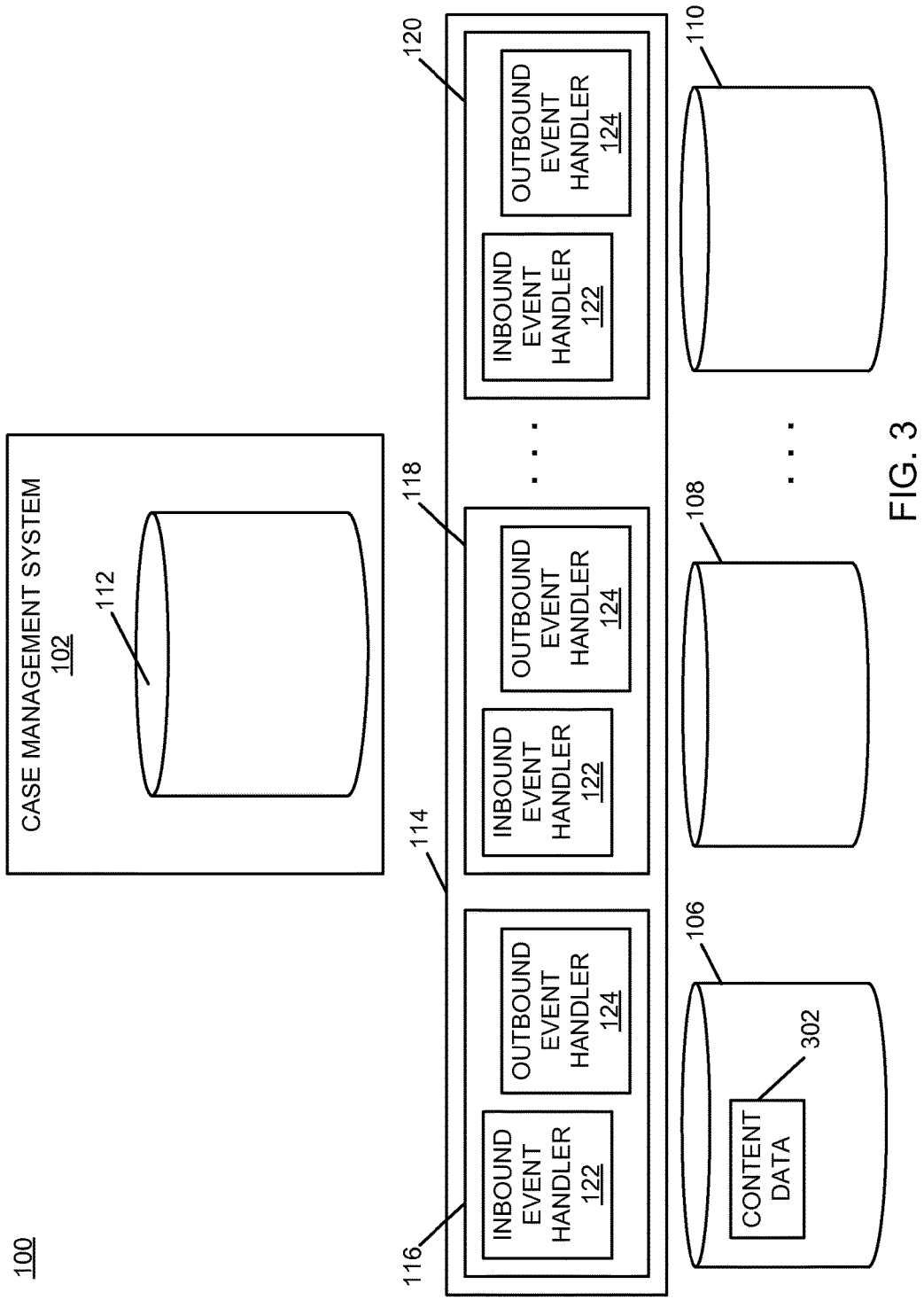
FIG. 3 is a block diagram of an example of an implementation of the system of FIG. 1 in an initial state prior to event messaging to implement case management integration with external content repositories according to an embodiment of the present subject matter.
Figure 4:
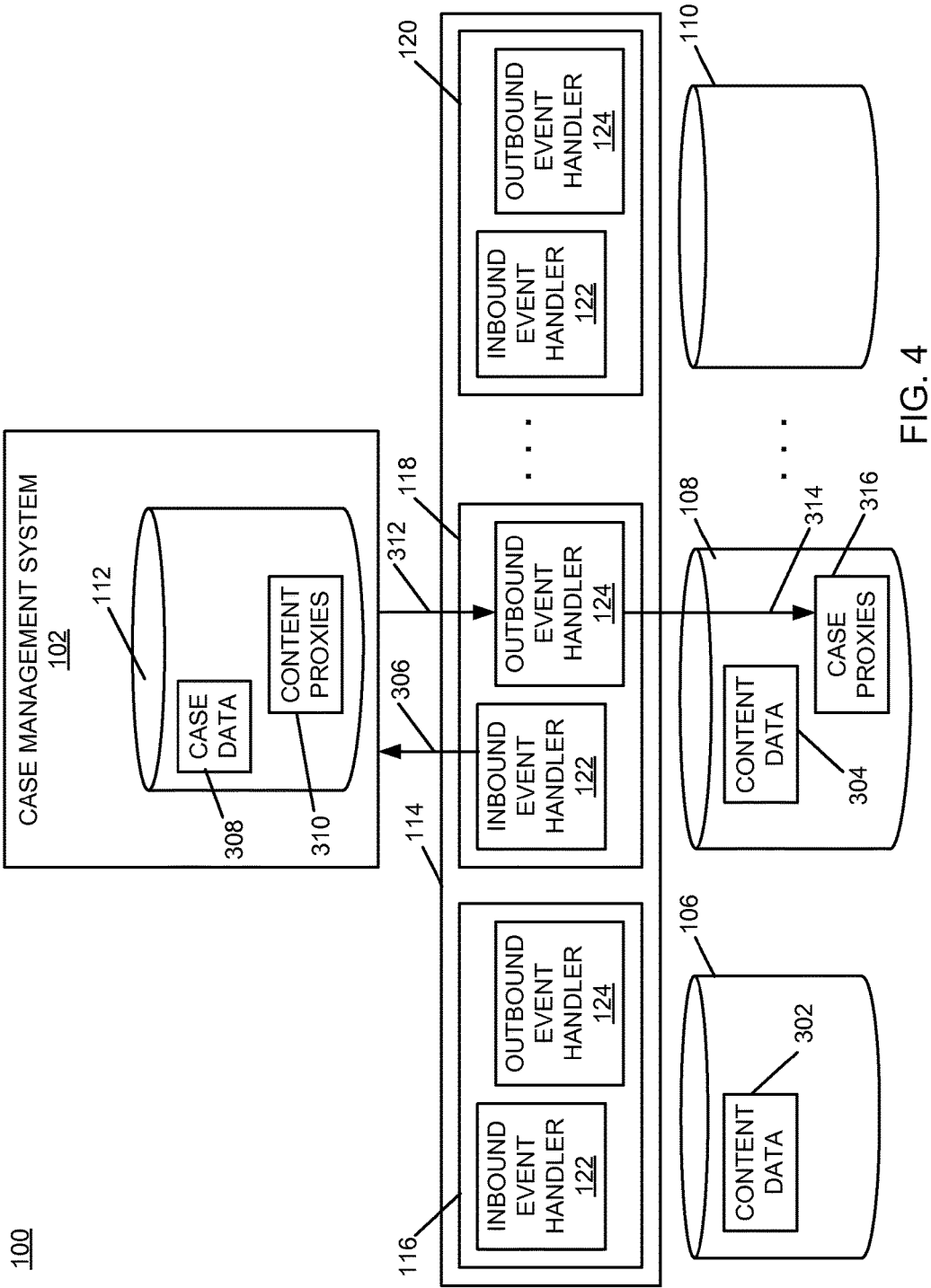
FIG. 4 is a block diagram of an example of an implementation of additional processing associated with the system of FIG. 3 in a subsequent state where a document has been created within an external repository to launch a case within the case management system to implement case management integration with external content repositories according to an embodiment of the present subject matter.
Figure 5:
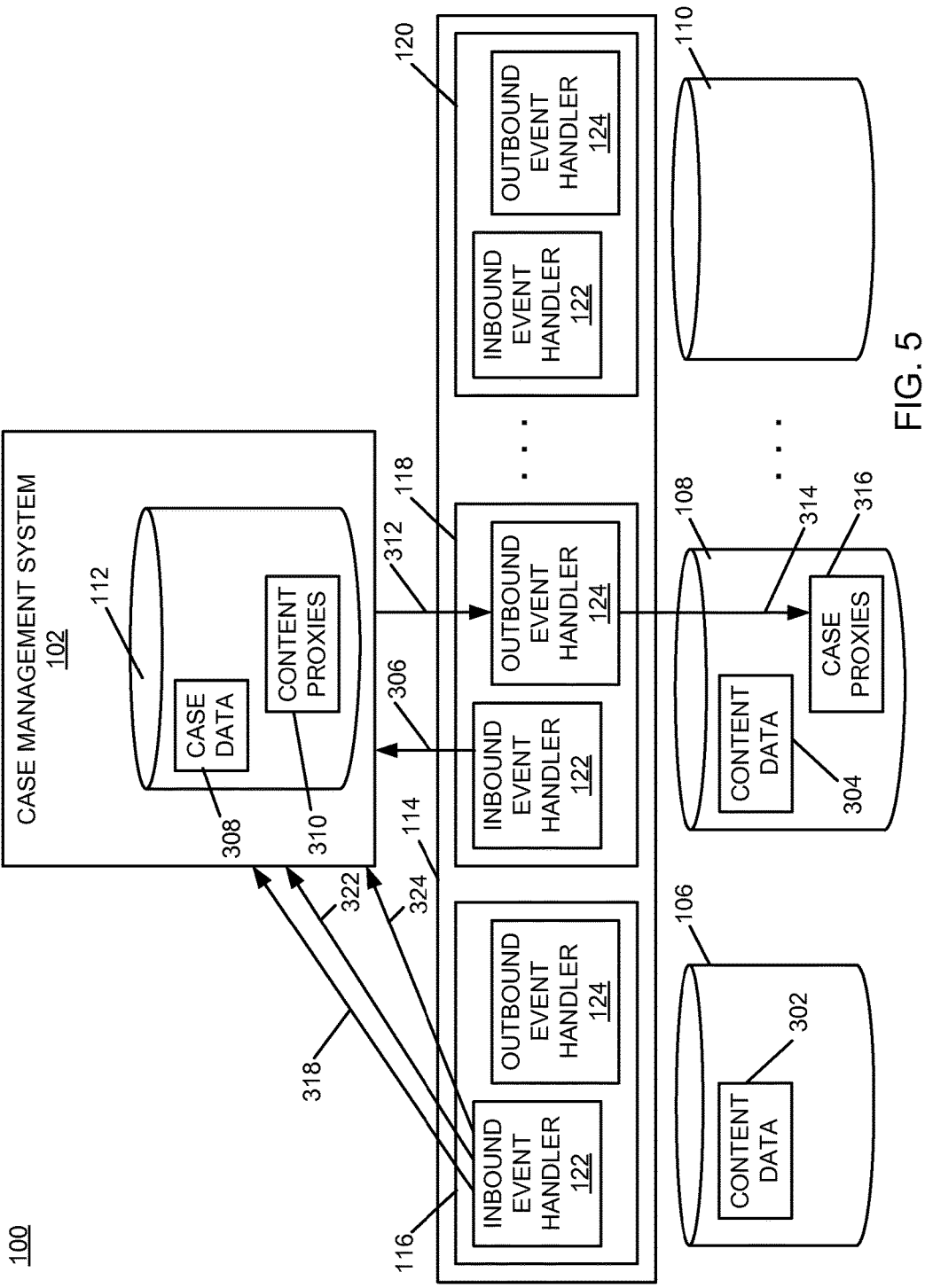
FIG. 5 is a block diagram of an example of an implementation of additional processing associated with the system of FIG. 4 in a subsequent state where a document that already exists within an external repository is added to a case within the case management system to implement case management integration with external content repositories according to an embodiment of the present subject matter.

FIG. 3 through FIG. 5 described below are block diagrams of an example of an implementation of the system 100 of FIG. 1 in more detail to show event flow between the respective devices of FIG. 1 to implement case management integration with external content repositories. The network 104 is omitted from FIG. 3 through FIG. 5 to avoid crowding within the drawing figures.

FIG. 3 is a block diagram of an example of an implementation of the system 100 of FIG. 1 in an initial state prior to event messaging to implement case management integration with external content repositories. Within FIG. 3, a logical representation of a distributed integration framework 114 is shown. The distributed integration framework 114 includes a distributed integration module 116, a distributed integration module 118, through a distributed integration module 120 that are each allocated to processing integration events between the case management system 102 and one or more of the content repository_A 106, the content repository_B 108, and the content repository 110_N, respectively.

It should be understood that the distributed integration framework 114 and the set of distributed integration modules 116 through 120 may be implemented/located in one or more of the respective integrated devices via the case and content integration management module 214. As such, the functionality of the distributed integration framework 114 and the set of distributed integration modules 116 through 120 described below may be distributed among the respective integrated case and content integration management modules 214.

Within each of the distributed integration modules 116 through 120, a distributed inbound event handler 122 manages inbound events to the case management system 102 from the respective content repository 106 through 110. Similarly, within each of the distributed integration modules 116 through 120, a distributed outbound event handler 124 manages outbound events from the case management system 102 to the respective content repository 106 through 110. Each of the distributed inbound event handler 122 and the distributed outbound event handler 124 implements a monitoring component to monitor for events and to generate ongoing events to the respective target device. Each of the distributed inbound event handler 122 and the distributed outbound event handler 124 may further implement one or more queues to sequence events (e.g., where multiple events are generated in response to an action at the case manager). Further, as described above, events may be processed individually or in batches, as appropriate for a given implementation. It should be noted that the monitoring component and queue(s) implemented in association with each of the distributed inbound event handler 122 and the distributed outbound event handler 124 are not illustrated within FIG. 3 through FIG. 5 to avoid crowding within the drawings. However, these components are considered to form a portion of or be associated with the respective event handlers, as appropriate for the given implementation.

It should be noted that complementary processing of events may be performed by the respective distributed inbound event handlers 122 and the distributed outbound event handlers 124 located at the respective devices as implemented by the respective distributed case and content integration management modules 214. As such, for any inbound event that is generated from any content repository 106 through 110 toward the case management system 102, the inbound event may be processed by the respective distributed inbound event handlers 122. Similarly, for any outbound event that is generated from the case management system 102 toward any content repository 106 through 110, the outbound event may be processed by the respective distributed outbound event handlers 124. As such, the distributed inbound event handlers 122 and outbound event handlers 124 form distributed logical processing units that perform the respective integration to the particular hardware platform/protocol, security implementation and conversion, and other functionality to effectively integrate the respective external content repositories with the case management system 102. Additionally, as described above, the distributed inbound event handlers 122 may programmatically invoke a programming interface, such as an API, associated with the case management system 102 to propagate the respective events to the application level of the case management system 102. Similarly, the distributed outbound event handlers 124 may programmatically invoke a programming interface, such as an API, associated with the respective content repositories to propagate the respective events to the application level of the respective devices.

It should be understood that the respective content repositories 106 through 110 may each store content data prior to integration of the respective devices. Similarly, the content repository_T 112 that is associated with the case management system 102 may store case data and/or content data prior to integration of the respective devices. However, the respective content repositories 108, 110, and 112 are illustrated without any data representations initially to assist with description of the functionality associated with the present technology. The content repository_A 106 is illustrated to include at least one document represented within content data 302. However, it is also understood that this content data 302 has not triggered any event processing for purposes of the examples below.

FIG. 4 is a block diagram of an example of an implementation of additional processing associated with the system 100 of FIG. 3 in a subsequent state where a document has been created within an external repository to launch a case within the case management system 102 to implement case management integration with external content repositories. As can be seen within FIG. 4, a document has been created within a content data area 304 within the content repository_B 108.

Creation of the document by a user within the content data area 304 within the content repository_B 108 causes the distributed inbound event handler 122 of the distributed integration module 118 to generate an inbound event 306 to the programming interface of the case management system 102 to notify the case management system 102 that a document has been created in the content repository_B 108. In response to the inbound event 306 that indicates that a document has been created in the content repository_B 108, the case management system 102 creates a new case folder within a case data area 308 and creates a proxy document within a content proxies area 310 within the content repository_T 112 of the case management system 102. The case management system 102 adds the newly-created proxy document in the content proxies area 310 to the newly-created case folder in the case data area 308.

In response to successful creation of the case folder, creation of the proxy document, and adding the newly-created proxy document to the newly-created case folder, the case management system 102 generates an outbound event 312 to the distributed outbound event handler 124 of the distributed integration module 118 to instruct the content repository_B 108 to create a proxy case and associate the created document with the proxy case. Receipt of the outbound event 312 by the distributed outbound event handler 124 causes the distributed outbound event handler 124 to notify the content repository_B 108 programming interface, via an outbound event 314, that a case has been created in the case management system 102.

In response to the outbound event 314 that indicates that a case has been created in the case management system 102, the content repository_B 108 creates a new proxy case folder within a case proxies area 316. The content repository_B 108 adds the previously-created document in the content data area 304 to the newly-created proxy case folder in the case proxies area 316.

As such, processing to create a case within the case management system 102 in response to creation of a document within an external repository has been described. Further, processing to create case proxy objects in external content repositories to represent cases within the case management system with which to associate existing documents within an external repository has been described. Additional example processing options will be described below beginning with FIG. 5.

FIG. 5 is a block diagram of an example of an implementation of additional processing associated with the system 100 of FIG. 4 in a subsequent state where a document that already exists within an external repository is added to a case within the case management system 102 to implement case management integration with external content repositories. As described above, a document has been previously created and already exists within a content data area 302 within the content repository_A 106.

To implement the addition of the existing document to an existing case in the case management system 102, a user may perform a search of the content data area 302 of the content repository 106 to identify the document to be added to the existing case. Invocation of user interface processing by the user to add the document to the case causes the distributed inbound event handler 122 within the distributed integration module 116 to generate an inbound event 318 that queries the case management system 102 to determine whether a proxy document for the existing document exists within the content proxies area 310. If the proxy document does not exist, the distributed inbound event handler 122 within the distributed integration module 116 notifies the case management system 102 via an inbound event 322 to the programming interface of the content management system 102 to create a proxy document for the existing document. In response to receipt of the inbound event 322, the case management system 102 creates a proxy document for the existing document of the content repository_A 106 within the content proxies area 310. In response to either instructing the case management system 102 to create the proxy document or in response to determining that a proxy document that represents the existing document already exists within the content proxies area 310, the distributed inbound event handler 122 within the distributed integration module 116 notifies the case management system 102, via an inbound event 324, to add the proxy document to the respective case folder (e.g., that was created as described in association with FIG. 4).

As such, collectively, FIG. 3 through FIG. 5 show event flow between the respective devices of FIG. 1 to implement case management integration with external content repositories via the distributed integration framework 114. As described above, case proxy objects may be created in external content repositories to represent cases within the case management system 102. Similarly, proxy content objects may be created within the case management system 102 to represent content (e.g., documents) within one or more external content repositories. Processing similar to the processing described above may be performed to delete content (and proxy content objects), to re-index an existing document, and to delete cases (and proxy case objects). Additionally, such processing may be implemented in association with each external repository to be integrated with the case management system 102, and proxy entities for the respective content and/or cases may be created to represent the objects that are stored remotely from the perspective of the device that creates and utilizes the respective proxy objects.

The flow charts described below reiterate some of the processing described above, and detail additional processing operations. It should additionally be noted that many other content and case proxy event processing and operations are possible based upon the description herein and all such possibilities are considered within the scope of the present subject matter.

Figure 6:
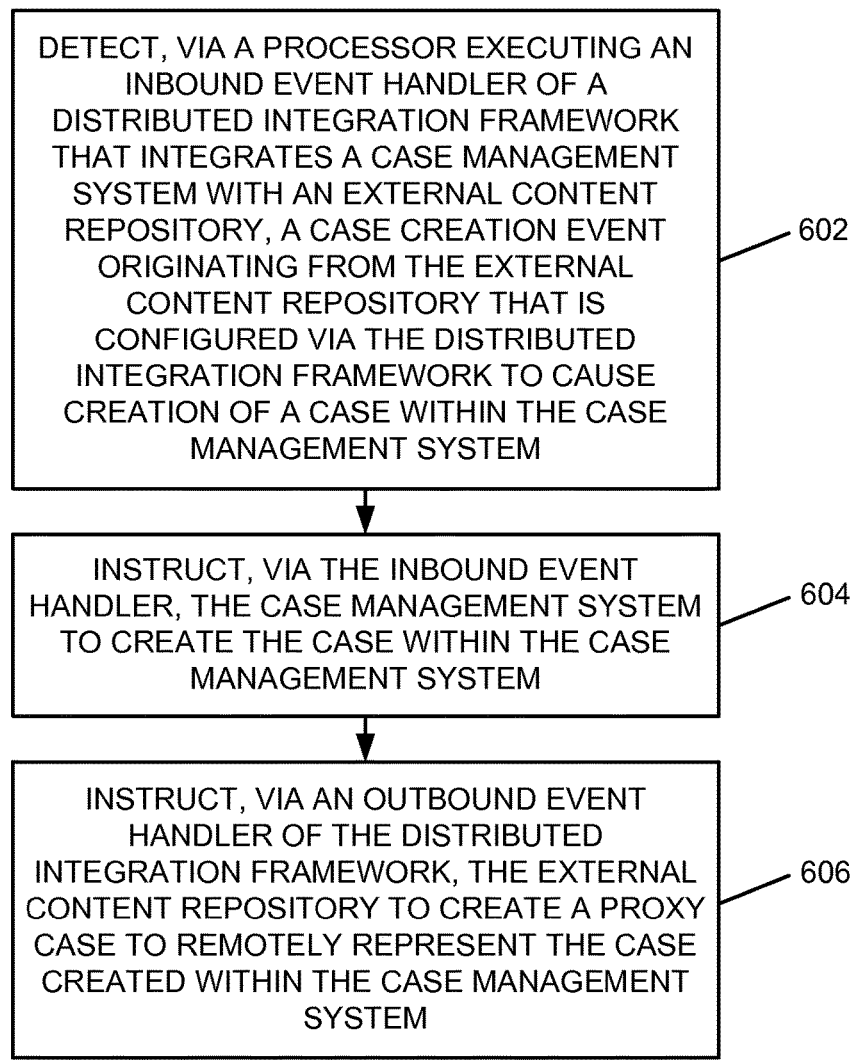
FIG. 6 is a flow chart of an example of an implementation of a process for case management integration with external content repositories according to an embodiment of the present subject matter.
Figure 7A:
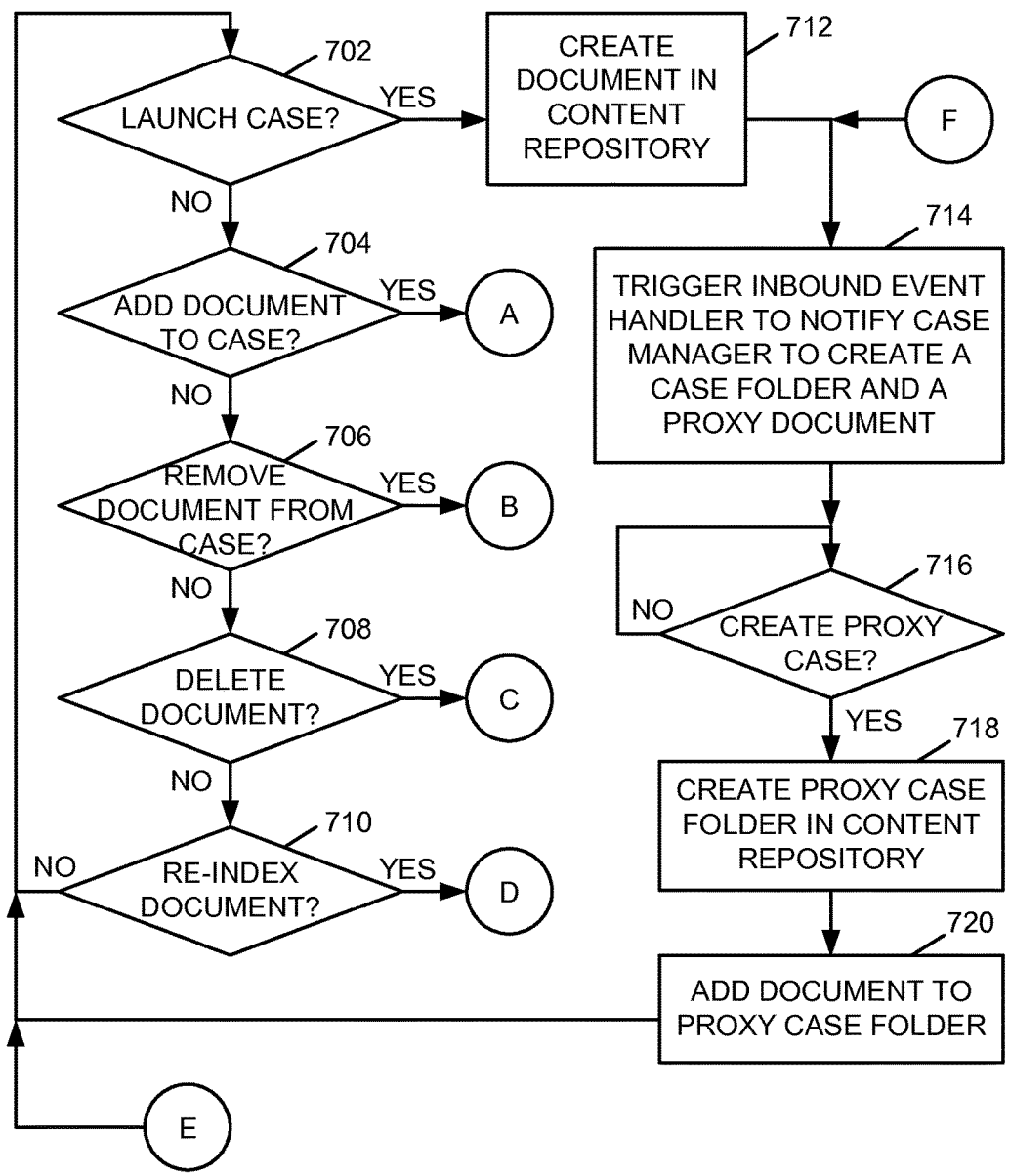
FIG. 7A is a flow chart of an example of an implementation of initial processing within a distributed process for case management integration with external content repositories according to an embodiment of the present subject matter.
Figure 7B:
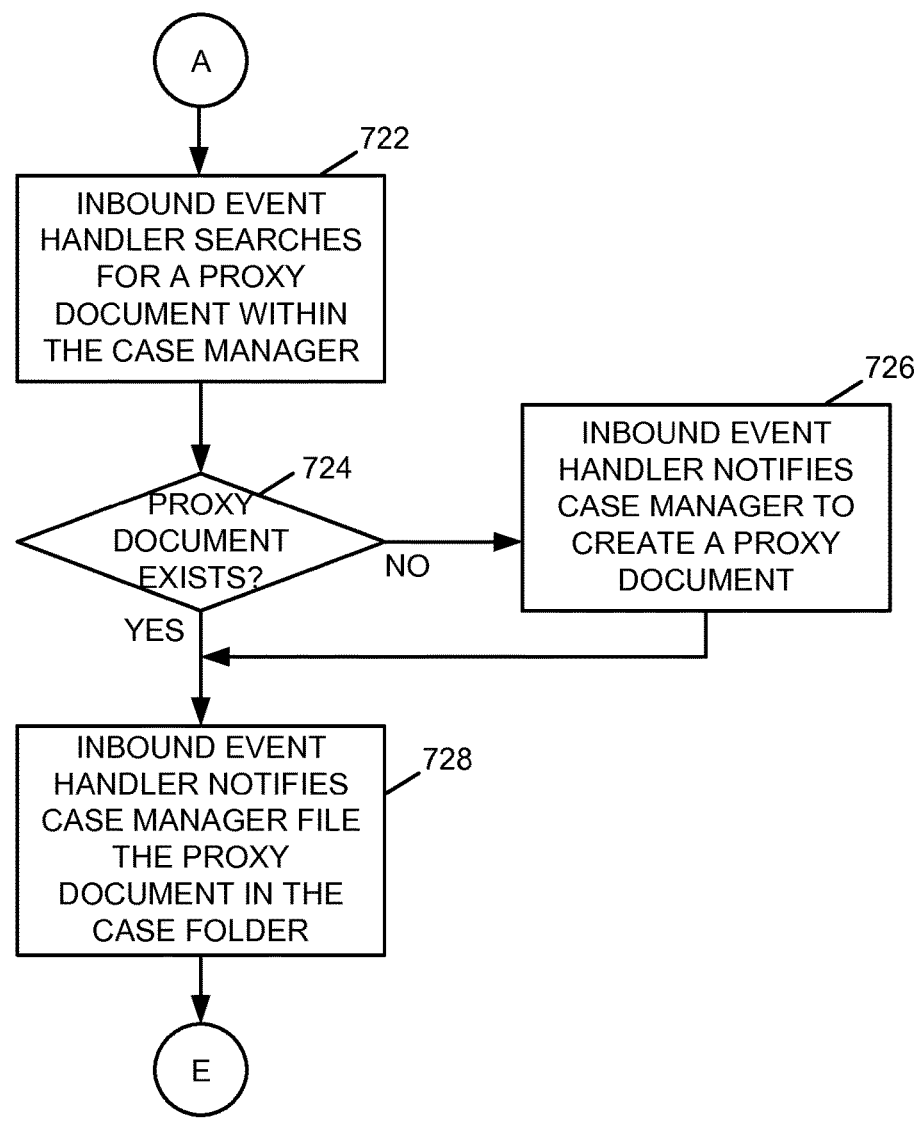
FIG. 7B is a flow chart of an example of an implementation of a first portion of additional processing within the distributed process for case management integration with external content repositories according to an embodiment of the present subject matter.
Figure 7C:
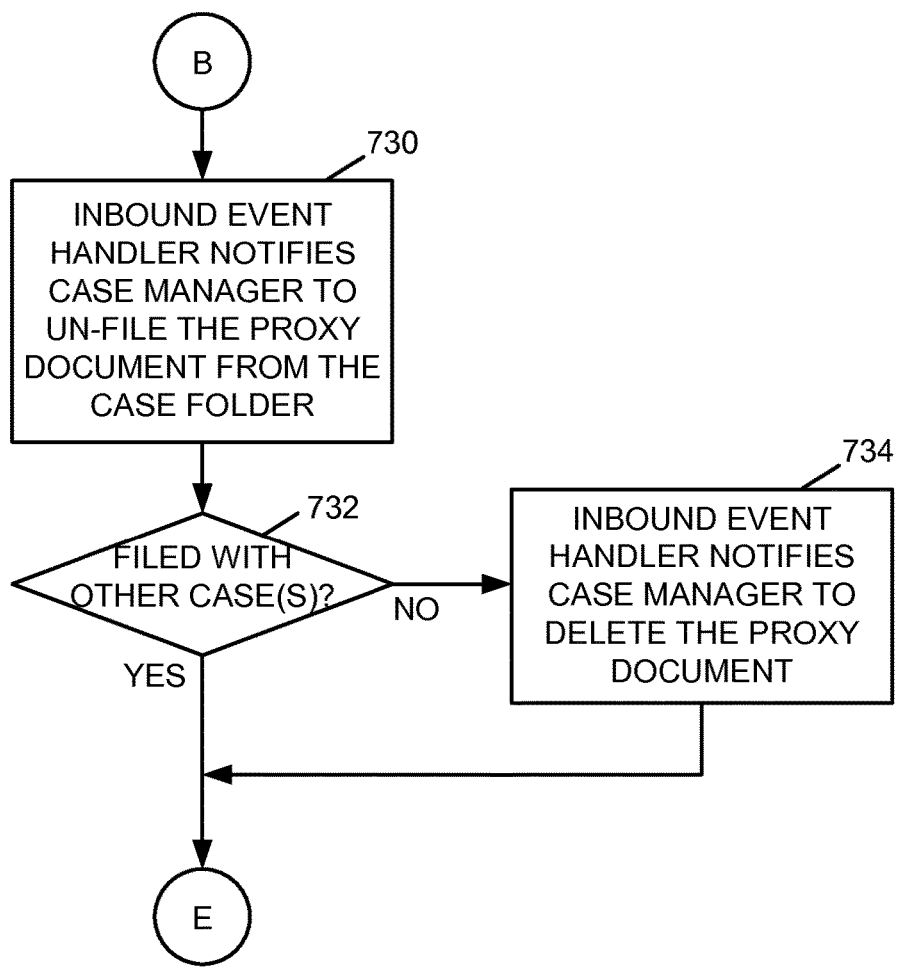
FIG. 7C is a flow chart of an example of an implementation of a second portion of additional processing within the distributed process for case management integration with external content repositories according to an embodiment of the present subject matter.
Figure 7D:
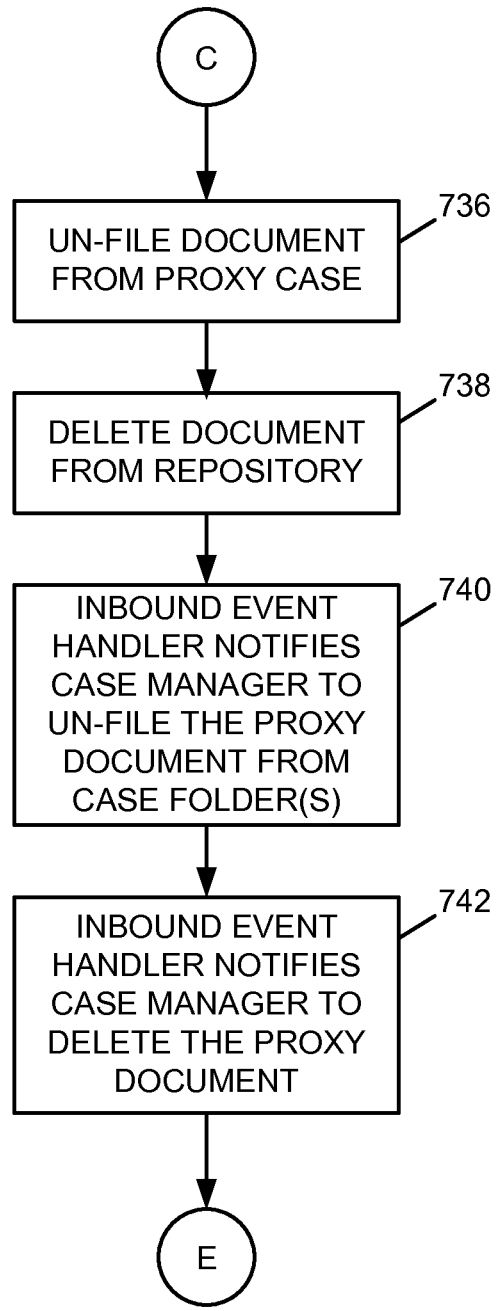
FIG. 7D is a flow chart of an example of an implementation of a third portion of additional processing within the distributed process for case management integration with external content repositories according to an embodiment of the present subject matter.
Figure 7E:
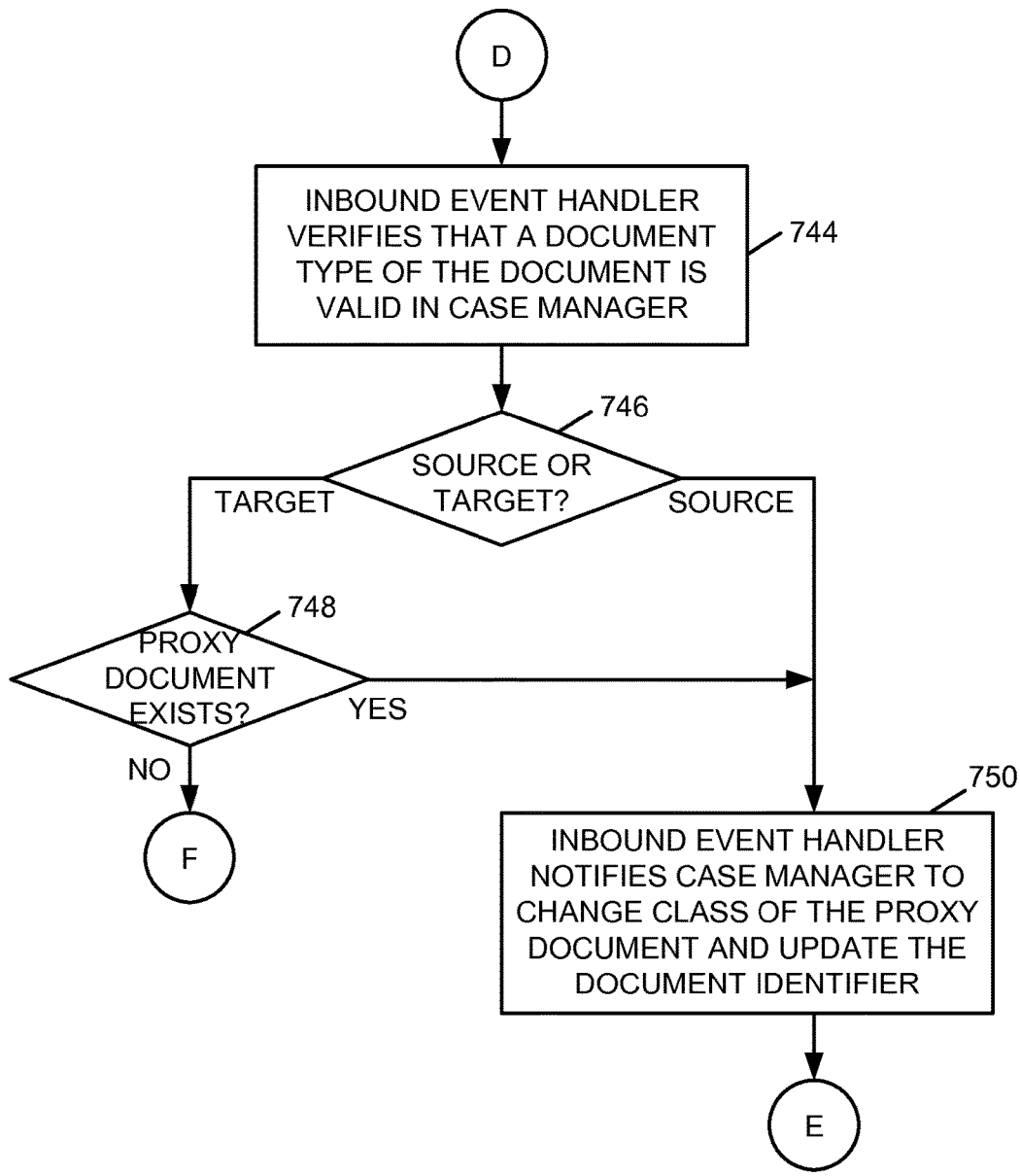
FIG. 7E is a flow chart of an example of an implementation of a fourth portion of additional processing within the distributed process for case management integration with external content repositories according to an embodiment of the present subject matter.

FIG. 6 through FIG. 7E described below represent example processes that may be executed by devices, such as the core processing module 200, to perform the automated case management integration with external content repositories associated with the present subject matter. Many other variations on the example processes are possible and all are considered within the scope of the present subject matter. The example processes may be performed by modules, such as the case and content integration management module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for case management integration with external content repositories. At block 602, the process 600 detects, via a processor executing an inbound event handler of a distributed integration framework that integrates a case management system with an external content repository, a case creation event originating from the external content repository that is configured via the distributed integration framework to cause creation of a case within the case management system. At block 604, the process 600 instructs, via the inbound event handler, the case management system to create the case within the case management system. At block 606, the process 600 instructs, via an outbound event handler of the distributed integration framework, the external content repository to create a proxy case to remotely represent the case created within the case management system.

FIGS. 7A-7E illustrate a flow chart of an example of an implementation of a distributed process 700 for case management integration with external content repositories. FIG. 7A illustrates initial processing within the process 700. The process 700 is assumed to be executed by the distributed integration framework 114 implemented by the case and content integration management module 214 operating at the case management system 102 and one or more of the content repository 106 through 110. As such, the processing described in association with the process 700 is from the perspective of the respective distributed inbound event handlers 122 and distributed outbound event handlers 124 that integrate the case management system 102 with the respective content repositories. It is understood that the process 700 collaborates with processes executed by the case management system 102 and the respective content repositories that respond to events generated by the process 700 and that these respective processes generate events received by the process 700. As such, the process 700 is considered to describe these additional processes that operate responsive to the respective events to perform the actions described. The case management system 102 will be referred to as a "case manager," and the content repositories 106 through 110 will be referred to as a "content repository," both for brevity.

At decision point 702, the process 700 begins higher-level processing by determining whether to launch a new case in the case manager by creation of a document within an external content repository. Description of affirmative determinations at the respective higher-level decision points within the process 700 will be deferred and described in detail further below.

As such, in response to determining that a document has not been created within an external content repository (i.e., not to launch a new case), the process 700 makes a determination at decision point 704 as to whether to add an existing document stored within an external content repository to an existing case within the case manager. In response to determining not to add an existing document stored within an external content repository to an existing case within the case manager, the process 700 makes a determination at decision point 706 as to whether to remove a document from a case managed by the case manager. In response to determining not to remove a document from a case managed by the case manager, the process 700 makes a determination at decision point 708 as to whether to delete an existing document from a content repository that is associated with a proxy case. In response to determining not to delete an existing document from a content repository that is associated with a proxy case, the process 700 makes a determination at decision point 710 as to whether to re-index a document. In response to determining not to re-index a document, the process 700 returns to decision point 702 and iterates as described above to complete the higher-level iterative processing associated with the example processing options of the process 700.

Returning to the description of decision point 702, in response to determining to launch a new case in the case manager by creation of a document within an external content repository, the process 700 creates a document in a content repository at block 712. This creation of a document may be responsive to user requesting creation of the document and storage of the document within the content repository. At block 714, the process 700 triggers the distributed inbound event handler to notify the case manager to create a case folder and to create a proxy document. This inbound event may include a programming interface call to the programming interface of the case manager. As described above, in response to receiving the notification to create the case, the case manager creates a case folder for the new case, creates a proxy document to locally represent the document created in the external repository, and adds the new proxy document to newly-created case folder. As also described above, in response to completion of the above-described processing, the case manager triggers the distributed outbound event handler to generate an acknowledgement notification that instructs the content repository to create a proxy case folder within the content repository to represent the newly-created case on the case manager and to add the new document created on the external content repository to the newly-created proxy case folder. As with inbound events, the outbound event may be invoked using an outbound programming interface call generated by the case manager.

As described above, the processing described in association with the process 700 represents distributed processing. As such, at decision point 716, the process 700 makes a determination at the respective content repository as to whether an instruction to create a new proxy case folder has been received from the distributed outbound event handler. In response to determining that an instruction to create a new proxy case folder has been received from the distributed outbound event handler, the process 700 creates a new proxy case in the content repository at block 718. At block 720, the process 700 adds the document initially created in the content repository to the newly-created proxy case at the content repository. The process 700 returns to decision point 702 and iterates as described above.

Returning to the description of decision point 704, in response to determining to add an existing document stored within an external content repository to an existing case within the case manager, the process 700 transitions to the processing shown and described in association with FIG. 7B.

FIG. 7B illustrates a first portion of additional processing associated with the distributed process 700 for case management integration with external content repositories. For purposes of the present portion of this example, it is assumed that a proxy case already exists at the content repository for the case to which the existing document is to be added, and processing similar to that described above to create a proxy case at the content repository is assumed to have already been performed. It is additionally assumed that a user has performed a search of the content repository and identified the document, and has provided the content repository name/identifier and document name via a programming interface command or instruction to add the existing external document to an existing case.

As such, at block 722, to initiate addition of an existing document stored within an external content repository to an existing case within the case manager, the process 700 causes the distributed inbound event handler to search for a proxy document within the case manager that represents the actual document in the content repository. At decision point 724, the process determines whether the proxy document exists within the case manager. In response to determining that the proxy document does not exist within the case manager, at block 726, the process 700 causes the distributed inbound event handler to notify the case manager to create a proxy document that represents the document stored in the content repository at the case manager. In response to notifying the case manager to create a proxy document that represents the document stored in the content repository at the case manager at block 726, or in response to determining at decision point 724 that the proxy document already exists at the case manager, the process 700 causes the distributed inbound event handler to notify the case manager to file the proxy document in the respective case folder at block 728. Again, as described above, for purposes of the present portion of this example, it is assumed that a proxy case already exists at the content repository for the case to which the existing document was added, and processing similar to that described above to create a proxy case at the content repository is assumed to have already been performed. The process 700 returns to the processing described in association with FIG. 7A at decision point 702 and iterates as described above.

Returning to the description of decision point 706, in response to determining to remove a document from a case managed by the case manager, the process 700 transitions to the processing shown and described in association with FIG. 7C.

FIG. 7C illustrates a second portion of additional processing associated with the distributed process 700 for case management integration with external content repositories. At block 730, the process 700 causes the distributed inbound event handler to notify the case manager to un-file the proxy document that represents the document in the respective content repository from the case folder. Invocation of this processing may also be performed in response to a user instruction via the case manager to un-file the respective document from a case. It is understood that the case manager un-files the proxy document from the case as requested responsive to the inbound event.

At decision point 732, the process 700 makes a determination as to whether the proxy document is filed with any other case(s) managed by the case manager. In response to determining that the proxy document is not filed with any other case(s) managed by the case manager, the process 700 causes the distributed inbound event handler to notify the case manager to delete the proxy document that represents the actual document stored in the respective content repository at block 734. It is understood that the case manager deletes the proxy document from the case as requested responsive to the inbound event. In response to causing the distributed inbound event handler to notify the case manager to delete the proxy document that represents the actual document stored in the respective content repository at block 734, or in response to determining that the proxy document is still associated with at least one case managed by the case manager at decision point 732, the process 700 returns to the processing described in association with FIG. 7A at decision point 702 and iterates as described above.

Returning to the description of decision point 708, in response to determining to delete an existing document from a content repository that is associated with a proxy case, the process 700 transitions to the processing shown and described in association with FIG. 7D.

FIG. 7D illustrates a third portion of additional processing associated with the distributed process 700 for case management integration with external content repositories. At block 736, the process 700 un-files the document from the proxy case in the content repository. As with other processing described above, invocation of this processing may also be performed in response to a user instruction via the case manager to un-file the respective document from a case. It is understood that the case manager unlinks the proxy document from the case as requested responsive to the inbound event. At block 738, the process 700 deletes the document from the content repository. At block 740, the process 700 causes the distributed inbound event handler to notify the case manager to un-file the proxy document that represents the deleted document from any case folder(s) with which the proxy document is associated. At block 742, the process 700 causes the distributed inbound event handler to notify the case manager to delete the proxy document. It is understood that the case manager deletes the proxy document as requested responsive to the inbound event. The process 700 returns to the processing described in association with FIG. 7A at decision point 702 and iterates as described above.

Returning to the description of decision point 710, in response to determining to re-index a document, the process 700 transitions to the processing shown and described in association with FIG. 7E.

FIG. 7E illustrates a fourth portion of additional processing associated with the distributed process 700 for case management integration with external content repositories. At block 744, the process 700 causes the distributed inbound event handler to verify that a document type of the document is valid in the case manager. At decision point 746, the process 700 makes a determination as to whether document is a source or a target of the document re-index operation. In response to determining that the respective document is a target of the document re-index operation, the process 700 makes a determination at decision point 748 as to whether a proxy document that represents the document exists in the case manager. In response to determining that the proxy document does not exist in the case manager, the process 700 treats this situation similarly to creation of a new document and returns to the processing described in association with FIG. 7A at block 714 and iterates as described above.

Returning to the description of decision point 746, in response to determining that the document is a source of the document re-index operation, or in response to determining at decision point 748 that a proxy document that represents the document exists in the case manager, the process 700 causes the distributed inbound event handler to notify the case manager to change a class of the proxy document and to update the document identifier for the document at block 750. The process 700 returns to the processing described in association with FIG. 7A at decision point 702 and iterates as described above.

As such, the process 700 provides for launching a new case within a case manager by creating a document at an external content repository. Additionally, a proxy document is created within the case manager and associated with the created case. The case manager acknowledges creation/launching of the new case, the proxy document, and the association of the proxy document with the new case. In response to the acknowledgement from the case manager, the content repository creates a proxy case and associates the actual document with the proxy case. Accordingly, both the case manager and the content repository have a representation of the content stored/managed by the other distributed device via the respective proxy objects. Additionally, the process 700 provides for addition of existing documents stored in a content repository to a case manager, removal of documents from cases managed by a case manager, deletion of documents, and re-indexing of documents between a case manager and one or more external content repositories.

As described above in association with FIG. 1 through FIG. 7E, the example systems and processes provide case management integration with external content repositories. Many other variations and additional activities associated with case management integration with external content repositories are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    by a programmed processor(s) set that executes an external content repository-to-case management system (ECR-CMS) event to application programming interface (event-to-API) converter and a case management system-to-external content repository (CMS-ECR) event-to-API converter of a distributed integration framework that, as executed, each performs one or more of protocol, security, and version (PSV) conversion(s) that operationally integrate a case management system with an external content repository, where the case management system and the external content repository are respectively implemented using heterogeneous platform technologies that prevent direct integration of the case management system and the external content repository:
        detecting, via the ECR-CMS event-to-API converter, a case creation system event originating from the external content repository that invokes the ECR-CMS event-to-API converter to cause creation of a case to be managed by the case management system, where one or more content objects within the external content repository will be associated with the case;
        controlling, via the ECR-CMS event-to-API converter by converting the detected case creation system event into a case creation application programming interface (API) control compatible with PSV requirements of the case management system, the case management system to create the case within the case management system;
        detecting, via the CMS-ECR event-to-API converter, a case creation acknowledgement system event originating from the case management system that invokes the CMS-ECR event-to-API converter to cause creation within the external content repository of a proxy case representation to remotely represent case content object linkages associated with the case as the case is managed by the case management system; and
        controlling, via the CMS-ECR event-to-API converter by converting the detected case creation acknowledgement system event into a proxy case creation API control compatible with PSV requirements of the external content repository, the external content repository from which the detected case creation system event originated to create the proxy case representation within the external content repository;
        where the distributed integration framework, as executed, provides automated computer-controlled device integration that (i) propagates through additional system-event-to-API conversions any update(s) performed on the proxy case representation within the external content repository to the case management system that manages the case and (ii) propagates through additional system-event-to-API conversions any update(s) performed on proxy document representations associated with the case within the case management system to the external content repository that stores actual documents for the case, where each additional system-event-to-API conversion is performed independently of any protocol, security, and version differences of the respective heterogeneous platform technologies upon which the case management system and the external content repository are implemented.

2. The method of claim 1, where detecting, via the ECR-CMS event-to-API converter, the case creation system event originating from the external content repository that invokes the ECR-CMS event-to-API converter to cause the creation of the case to be managed by the case management system comprises:
    detecting, via the ECR-CMS event-to-API converter, creation of a document within the external content repository.

3. The method of claim 2, where controlling, via the ECR-CMS event-to-API converter by converting the detected case creation system event into the case creation API control compatible with the PSV requirements of the case management system, the case management system to create the case within the case management system comprises controlling the case management system to create a case folder, and further comprising, via the ECR-CMS event-to-API converter by use of respective API controls of the case management system:
    controlling the case management system to create a proxy document representation locally to remotely represent (i) the document created within the external content repository and (ii) case content document linkages created within the case management system associated with the document; and
    controlling the case management system to add the proxy document representation to the case folder that creates a case content document linkage between the document in the external content repository and the case managed within the case management system.

4. The method of claim 2, where controlling, via the CMS-ECR event-to-API converter by converting the detected case creation acknowledgement system event into the proxy case creation API control compatible with the PSV requirements of the external content repository, the external content repository from which the detected case creation system event originated to create the proxy case representation within the external content repository further comprises:

controlling, via the CMS-ECR event-to-API converter, the external content repository to create a proxy case folder representation associated with the created proxy case representation.

5. The method of claim 4, further comprising controlling, via the CMS-ECR event-to-API converter, the external content repository to add the created document to the proxy case folder representation that creates a local case content document linkage between the document in the external content repository and the case managed within the case management system.

6. The method of claim 1, further comprising:
detecting, via the ECR-CMS event-to-API converter, a document removal system event originating from the external content repository that invokes the ECR-CMS event-to-API converter to cause removal of a document from the case within the case management system; and
controlling, via the ECR-CMS event-to-API converter, the case management system to un-file the document from the case, where the case management system un-files a proxy document representation that represents the document in the external content repository from a case folder associated with the case responsive to the API control.

7. The method of claim 6, further comprising:
determining, via the ECR-CMS event-to-API converter, whether the proxy document representation is associated with at least one other case managed by the case management system; and
controlling, via the ECR-CMS event-to-API converter, the case management system to delete the proxy document representation in response to determining that the proxy document is not associated with the at least one other case managed by the case management system.

8. The method of claim 1, where the distributed integration framework, as executed, integrates the case management system with a plurality of heterogeneous external content repositories and implements a distinct paired ECR-CMS event-to-API converter and CMS-ECR event-to-API converter for each respective heterogeneous external content repository that are each specifically designed to perform one or more of the protocol, the security, and the version conversion(s) that integrate the case management system with each respective heterogeneous external content repository, where the method further comprises for each paired ECR-CMS event-to-API converter and CMS-ECR event-to-API converter:

controlling, via the inbound event handler respective ECR-CMS event-to-API converter, the case management system to perform application-level processing associated with system events originating from the respective heterogeneous external content repository; and
controlling, via the respective CMS-ECR event-to-API converter, the respective heterogeneous external content repository to perform application-level processing associated with system events originating from the case management system.

9. A system, comprising:
a processor(s) set programmed to:
execute an external content repository-to-case management system (ECR-CMS) event-to-API converter and a case management system-to-external content repository (CMS-ECR) event-to-API converter of a distributed integration framework that, as executed, each performs one or more of protocol, security, and version (PSV) conversion(s) that operationally integrate a case management system with an external content repository, where the case management system and the external content repository are respectively implemented using heterogeneous platform technologies that prevent direct integration of the case management system and the external content repository;
the processor(s) set being further programmed to:
detect, via the ECR-CMS event-to-API converter, a case creation system event originating from the external content repository that invokes the ECR-CMS event-to-API converter to cause creation of a case to be managed by the case management system, where one or more content objects within the external content repository will be associated with the case;
control, via the ECR-CMS event-to-API converter by converting the detected case creation system event into a case creation application programming interface (API) control compatible with PSV requirements of the case management system, the case management system to create the case within the case management system;
detect, via the CMS-ECR event-to-API converter, a case creation acknowledgement system event originating from the case management system that invokes the CMS-ECR event-to-API converter to cause creation within the external content repository of a proxy case representation to remotely represent case content object linkages associated with the case as the case is managed by the case management system; and
control, via the CMS-ECR event-to-API converter by converting the detected case creation acknowledgement system event into a proxy case creation API control compatible with PSV requirements of the external content repository, the external content repository from which the detected case creation system event originated to create the proxy case representation within the external content repository;
where the distributed integration framework, as executed, provides automated computer-controlled device integration that (i) propagates through additional system-event-to-API conversions any update(s) performed on the proxy case representation within the external content repository to the case management system that manages the case and (ii) propagates through additional system-event-to-API conversions any update(s) performed on proxy document representations associated with the case within the case management system to the external content repository that stores actual documents for the case, where each additional system-event-to-API conversion is performed independently of any protocol, security, and version differences of the respective heterogeneous platform technologies upon which the case management system and the external content repository are implemented.

10. The system of claim 9, where in being programmed to detect, via the ECR-CMS event-to-API converter, the case creation system event originating from the external content repository that invokes the ECR-CMS event-to-API converter to cause the creation of the case to be managed by the case management system, the processor(s) set is programmed to:

detect, via the ECR-CMS event-to-API converter, creation of a document within the external content repository.

11. The system of claim 10, where in being programmed to control, via the ECR-CMS event-to-API converter by converting the detected case creation system event into the case creation API control compatible with the PSV requirements of the case management system, the case management system to create the case within the case management system, the processor(s) set is programmed to control the case management system to create a case folder, and the processor(s) set is further programmed to, via the ECR CMS event-to-API converter by use of respective API controls of the case management system:

control the case management system to create a proxy document representation locally to remotely represent (i) the document created within the external content repository and (ii) case content document linkages created within the case management system associated with the document; and control the case management system to add the proxy document representation to the case folder that creates a case content document linkage between the document in the external content repository and the case managed within the case management system.

12. The system of claim 10, where in being programmed to control, via the CMS-ECR event-to-API converter by converting the detected case creation acknowledgement system event into the proxy case creation API control compatible with the PSV requirements of the external content repository, the external content repository from which the detected case creation system event originated to create the proxy case representation within the external content repository, the processor(s) set is further programmed to:

control, via the CMS-ECR event-to-API converter, the external content repository to create a proxy case folder representation associated with the created proxy case representation.

13. The system of claim 12, where the processor(s) set is further programmed to control, via the CMS-ECR event-to-API converter, the external content repository to add the created document to the proxy case folder representation that creates a local case content document linkage between the document in the external content repository and the case managed within the case management system.

14. The system of claim 9, where the processor(s) set is further programmed to:

detect, via the ECR-CMS event-to-API converter, a document removal system event originating from the external content repository that invokes the ECR-CMS event-to-API converter to cause removal of a document from the case within the case management system; and control, via the ECR-CMS event-to-API converter, the case management system to un-file the document from the case, where the case management system un-files a proxy document representation that represents the document in the external content repository from a case folder associated with the case responsive to the API control.

15. The system of claim 14, where the processor(s) set is further programmed to:

determine, via the ECR-CMS event-to-API converter, whether the proxy document representation is associated with at least one other case managed by the case management system; and control, via the ECR-CMS event-to-API converter, the case management system to delete the proxy document representation in response to determining that the proxy document is not associated with the at least one other case managed by the case management system.

16. The system of claim 9, where the distributed integration framework, as executed, integrates the case management system with a plurality of heterogeneous external content repositories and implements a distinct paired ECR-CMS event-to-API converter and CMS-ECR event-to-API converter for each respective heterogeneous external content repository that are each specifically designed to perform one or more of the protocol, the security, and the version conversion(s) that integrate the case management system with each respective heterogeneous external content repository, where for each paired ECR-CMS event-to-API converter and CMS-ECR event-to-API converter:

the processor(s) set is programmed to control, via the respective ECR-CMS event-to-API converter, the case management system to perform application-level processing associated with system events originating from the respective heterogeneous external content repository; and the processor(s) set is programmed to control, via the respective CMS-ECR event-to-API converter, the respective heterogeneous external content repository to perform application-level processing associated with system events originating from the case management system.

17. A computer program product, comprising:

a computer readable storage device having computer readable program code embodied therewith, where the computer readable program code when executed on a computer causes the computer to:

execute an external content repository-to-case management system (ECR-CMS) event-to-API converter and a case management system-to-external content repository (CMS-ECR) event-to-API converter of a distributed integration framework that, as executed, each performs one or more of protocol, security, and version (PSV) conversion(s) that operationally integrate a case management system with an external content repository, where the case management system and the external content repository are respectively implemented using heterogeneous platform technologies that prevent direct integration of the case management system and the external content repository;

detect, via the ECR-CMS event-to-API converter, a case creation system event originating from the external content repository that invokes the ECR-CMS event-to-API converter to cause creation of a case to be managed by the case management system, where one or more content objects within the external content repository will be associated with the case;

instruct control, via the ECR-CMS event-to-API converter by converting the detected case creation system event into a case creation application programming interface (API) control compatible with PSV requirements of the case management system, the case management system to create the case within the case management system;

detect, via the CMS-ECR event-to-API converter, a case creation acknowledgement system event originating from the case management system that invokes the CMS-ECR event-to-API converter to cause creation within the external content repository of a proxy case representation to remotely represent case content object linkages associated with the case as the case is managed by the case management system; and control, via the CMS-ECR event-to-API converter by converting the detected case creation acknowledgement system event into a proxy case creation API control compatible with PSV requirements of the external content repository, the external content repository from which the detected case creation system event originated to create the proxy case representation within the external content repository;

where the distributed integration framework, as executed, provides automated computer-controlled device integration that (i) propagates through additional system-event-to-API conversions any update(s) performed on the proxy case representation within the external content repository to the case management system that manages the case and (ii) propagates through additional system-event-to-API conversions any update(s) performed on proxy document representations associated with the case within the case management system to the external content repository that stores actual documents for the case, where each additional system-event-to-API conversion is performed independently of any protocol, security, and version differences of the respective heterogeneous platform technologies upon which the case management system and the external content repository are implemented.

18. The computer program product of claim 17, where in causing the computer to detect, via the ECR-CMS event-to-API converter, the case creation system event originating from the external content repository that invokes the ECR-CMS event-to-API converter to cause the creation of the case within to be managed by the case management system, the computer readable program code when executed on the computer causes the computer to:

detect, via the ECR-CMS event-to-API converter, creation of a document within the external content repository.

19. The computer program product of claim 18, where in causing the computer to control, via the ECR-CMS event-to-API converter by converting the detected case creation system event into the case creation API control compatible with the PSV requirements of the case management system, the case management system to create the case within the case management system, the computer readable program code when executed on the computer causes the computer to control the case management system to create a case folder, and the computer readable program code when executed on the computer further causes the computer, via the ECR-CMS event-to-API converter by use of respective API controls of the case management system, to:

control the case management system to create a proxy document representation locally to remotely represent (i) the document created within the external content repository and (ii) case content document linkages created within the case management system associated with the document; and control the case management system to add the proxy document representation to the case folder that creates a case content document linkage between the document in the external content repository and the case managed within the case management system.

20. The computer program product of claim 18, where in causing the computer to control, via the CMS-ECR event-to-API converter by converting the detected case creation acknowledgement system event into the proxy case creation API control compatible with the PSV requirements of the external content repository, the external content repository from which the detected case creation system event originated to create the proxy case representation within the external content repository, the computer readable program code when executed on the computer causes the computer to:

control, via the CMS-ECR event-to-API converter, the external content repository to create a proxy case folder representation associated with the created proxy case representation.

21. The computer program product of claim 20, where the computer readable program code when executed on the computer further causes the computer to control, via the CMS-ECR event-to-API converter, the external content repository to add the created document to the proxy case folder representation that creates a local case content document linkage between the document in the external content repository and the case managed within the case management system.

22. The computer program product of claim 17, where the computer readable program code when executed on the computer further causes the computer to:

detect, via the ECR-CMS event-to-API converter, a document removal system event originating from the external content repository that invokes the ECR-CMS event-to-API converter to cause removal of a document from the case within the case management system; and control, via the ECR-CMS event-to-API converter, the case management system to un-file the document from the case, where the case management system un-files a proxy document representation that represents the document in the external content repository from a case folder associated with the case responsive to the API control.

23. The computer program product of claim 22, where the computer readable program code when executed on the computer further causes the computer to:

determine, via the ECR-CMS event-to-API converter, whether the proxy document representation is associated with at least one other case managed by the case management system; and control, via the ECR-CMS event-to-API converter, the case management system to delete the proxy document representation in response to determining that the proxy document is not associated with the at least one other case managed by the case management system.

24. The computer program product of claim 17, where the distributed integration framework, as executed, integrates the case management system with a plurality of heterogeneous external content repositories and implements a distinct paired ECR-CMS event-to-API converter and CMS-ECR event-to-API converter for each respective heterogeneous external content repository that are each specifically designed to perform one or more of the protocol, the security, and the version conversion(s) that integrate the case management system with each respective heterogeneous external content repository, where for each paired ECR-CMS event-to-API converter and CMS-ECR event-to- API converter the computer readable program code when executed on the computer further causes the computer to:
- control, via the respective ECR-CMS event-to-API converter, the case management system to perform application-level processing associated with system events originating from the respective heterogeneous external content repository; and
- control, via the respective CMS-ECR event-to-API converter, the respective heterogeneous external content repository to perform application-level processing associated with system events originating from the case management system.

* * * * *